US006637267B2

(12) United States Patent
Fiebelkorn et al.

(10) Patent No.: US 6,637,267 B2
(45) Date of Patent: Oct. 28, 2003

(54) DIAGNOSTIC SYSTEM AND METHOD, ESPECIALLY FOR A VALVE

(75) Inventors: Klaus-Dieter Fiebelkorn, Minfeld (DE); Gerhard Klebert, Bad Herrenalb (DE); Alf Puettmer, Karlsruhe (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/108,899

(22) Filed: Mar. 29, 2002

(65) Prior Publication Data

US 2003/0019297 A1 Jan. 30, 2003

Related U.S. Application Data

(63) Continuation of application No. PCT/DE00/03428, filed on Sep. 28, 2000.

(30) Foreign Application Priority Data

Sep. 30, 1999 (DE) .......................................... 199 47 129

(51) Int. Cl.⁷ ................................................. G01H 1/00
(52) U.S. Cl. .............................. 73/587; 73/659; 73/592
(58) Field of Search ........................... 73/587, 659, 592

(56) References Cited

U.S. PATENT DOCUMENTS

| | | | | |
|---|---|---|---|---|
| 4,428,236 A | * | 1/1984 | Votava et al. | 73/587 |
| 4,884,449 A | * | 12/1989 | Nishimoto et al. | 73/587 |
| 4,896,101 A | | 1/1990 | Cobb | |
| 4,965,513 A | * | 10/1990 | Haynes et al. | 73/659 |
| 5,416,724 A | | 5/1995 | Savic | |
| 6,189,384 B1 | * | 2/2001 | Piety et al. | 73/659 |
| 2002/0144551 A1 | * | 10/2002 | Satsangi | 73/659 |

FOREIGN PATENT DOCUMENTS

| | | |
|---|---|---|
| DE | 222 962 A1 | 5/1985 |
| DE | 41 16 345 A1 | 11/1992 |
| DE | 299 12 847 U1 | 10/2000 |
| DE | 199 24 377 A1 | 12/2000 |
| EP | 0 637 713 A1 | 2/1995 |
| FR | 2116922 | 7/1972 |
| JP | 57040185 | 3/1982 |
| JP | 2059637 | 2/1990 |
| JP | 4235390 | 8/1992 |

OTHER PUBLICATIONS

Wolfensberger, Ulrich: Maschinenschwingungen gezielt bekaempfen., *Technische Rundschau*, 22/88, pp 56–61; 1998.
Weisshaupt, Bruno: Vom Schalter zum Sensor., *TR Transfer*, Nr. 18, pp. 14–16 1994.
Schramm, Ullrich,: Optische und akustische Qualitaeskontrolle. *Bild & Ton*, vol. 45, pp. 320–326, 1992.

* cited by examiner

*Primary Examiner*—Hezron Williams
*Assistant Examiner*—Nashmiya Fayyaz
(74) *Attorney, Agent, or Firm*—Sughrue Mion, PLLC (57) ABSTRACT

The invention relates to a diagnostic system and method, especially for a valve (2) that can be actuated by a positioner (9) via a drive (6). The system utilizes a sensor (12) for recording structure-related sound and has a device (14) for evaluating a recorded measurement signal (13). A spectral region greater than 50 kHz is evaluated for conducting fault recognition. A fault indication signal is generated if the intensity of the measurement signal in this spectral region exceeds a defined threshold value. The sound caused by cavitation is primarily evaluated for conducting fault recognition.

22 Claims, 4 Drawing Sheets

FIG 1

| 1: | pipe | | |
|---|---|---|---|
| 2: | valve | 10: | connecting element |
| 3: | valve seat | 11: | data interface |
| 4: | closing element | 12: | acoustic sensor |
| 5: | medium | 13: | output signal |
| 6: | drive | 14: | unit |
| 7: | valve rod | 15: | signal conditioning circuit |
| 8: | yoke | 16: | arithmetic logic unit |
| 9: | positioner | 17: | memory |

FIG 2

| | | | |
|---|---|---|---|
| 19: | housing | | |
| 20: | acoustic sensor | 31: | high-pass filter |
| 21: | transducer element | 32: | bandpass filter |
| 22: | impedance converter | 33: | amplifier |
| 23: | thermal insulation | 34: | peak value detector |
| 24: | cooling device | 35: | averaging unit |
| 25: | high pass filter | 36: | root-mean-square unit |
| 26: | supply line | 37: | multiplexer |
| 27: | filter | 38: | threshold discriminator |
| 28: | measurement signal | 39-41: | line |
| 29: | threaded stem | 42: | sequence control |
| 30: | amplifier | 43: | voltage monitor |

FIG 4

| | | | |
|---|---|---|---|
| 50: | acoustic waveguide | 57: | external electromagnetic shield |
| 51: | threaded stem | 58: | internal electromagnetic shield |
| 52: | acoustic sensor | 59: | sleeve |
| 53: | threaded hole | 60: | insulating disk |
| 54: | threaded stem | 61: | micromechanical filter |
| 55: | cooling element | 62: | piezo-electric element |
| 56: | shielding disk | 63: | micromechanical filter |
| 64: | impedance converter | | |
| 65: | insulating layer | | |
| 66: | active filter | | |
| 67: | connection | | |
| 68: | cable | | |
| 69: | sensor signal | | |
| 70: | supply | | |
| 71: | shielded line | | |
| 72: | cooling element | | |

DIAGNOSTIC SYSTEM AND METHOD, ESPECIALLY FOR A VALVE

This is a Continuation of International Application PCT/DE00/03428, with an international filing date of Sep. 28, 2000, which was published under PCT Article 21(2) in German, and the disclosure of which is incorporated into this application by reference.

FIELD OF AND BACKGROUND OF THE INVENTION

The invention relates generally to a diagnostic system and a diagnostic method for a valve, which can be actuated by a positioner via a drive.

In many areas of process and power technology, trouble-free operation of a plant depends on the performance of the control and check valves used. To avoid costly unscheduled interruptions of plant operations, valve damage should be detected as early as possible, e.g., before the failure of a valve causes the plant to be shut down. For instance, defective valve seats can cause leakage flows that produce broadband sound emission. Recording and evaluating the sound emitted by a valve can consequently be used for early detection of valve damage. Thus, since valve faults can lead to system damage and increased follow-up costs, diagnostics, possibly with automatic detection and programmable evaluation of the faults, are highly useful. Statistical evaluation of the diagnostic data can be used to optimize the maintenance processes and effectuate timely replacement of damaged valves as well as to evaluate and classify the valve manufacturers with respect to quality or to evaluate the suitability of certain valves for different process types.

European Patent Number EP 0 637 713 A1 discloses a diagnostic system with a structure-borne noise sensor, which is mounted to the housing of a valve and the signal of which is supplied to a device for detecting and storing structure-borne noise spectra. Characteristic curves of the sound level versus sound frequency are different in an intact, defect-free, valve than they are in a defective valve. Forming a surface integral and defining an acceptable deviation makes it possible to detect a defective valve. This measurement is suitable, in particular, to determine valve wear caused by corrosion, cavitation, or erosion. For evaluation, the structure-borne noise spectrum in a frequency range of between 2 kHz and 10 kHz is evaluated.

The German Utility Model Application with the official file number 299 12 847.4 proposes an acoustic sensor, particularly an ultrasonic sensor, for acoustic valve diagnostics having a substantially cup-shaped housing, in the interior of which a piezo-electric measuring element is arranged. To improve immunity of the device against electromagnetic fields, a shield with a sleeve is provided, one base of which is sealed with an insulating disk that is provided with an electrically conductive coating. The measurement electronics are galvanically decoupled relative to the mounting means and thereby relative to a mounting location. To fix the device to the mounting location, the bottom of the cup-shaped housing is provided with a coaxially arranged threaded stem on its exterior. The acoustic sensor permits detection of the structure-borne noise that is generated in a valve body by flow sounds in a frequency range greater than about 100 kHz without cross sensitivity for electromagnetic fields. For further information on the construction of the acoustic sensor, see the aforementioned utility model application.

The German patent application with the official file number 199 24 377.8 proposes a diagnostic system for a valve that can be actuated by a positioner via a drive and comprises a device for detecting, storing and evaluating the structure-borne noise spectra measured on the valve. To permit particularly reliable valve diagnostics, a structure-borne noise spectrum that is recorded for a slightly open intact valve can be stored in the detection, storage and evaluation unit. For the diagnosis, a structure-borne noise spectrum recorded for a closed valve is compared with the stored spectrum and the result of the comparison is used as a criterion for valve leakage.

OBJECTS OF THE INVENTION

An object of the present invention is to provide a diagnostic system and a diagnostic method, which are distinguished by improved reliability of the diagnostic result.

SUMMARY OF THE INVENTION

To address the above and other deficiencies in the prior art, a diagnostic system, in particular for a valve, is proposed which has a sensor operable to sense structure-borne noise in the valve and an evaluation unit operable to evaluate a recorded measurement signal. The evaluation unit is configured such that a spectral region of the measurement signal above a first limit frequency, where the first limit frequency is greater than 50 kHz, is evaluated for fault detection and a fault indication signal is generated if an intensity of the measurement signal in the spectral region exceeds a threshold value.

Also, a method for determining a fault in a component such as a valve through which a gaseous or a liquid material flows is proposed in which the method includes measuring an acoustic signal generated in the vicinity of the valve as the gaseous or liquid material flows through the valve, separating the acoustic signal into a low frequency portion and a high frequency portion, and determining a likelihood value representing a likelihood that the valve has a fault, wherein the likelihood value is based on the high frequency portion of the acoustic signal.

According to one embodiment of the invention, a distinction is advantageously drawn between a lower spectral noise region, which essentially comprises the operating noise of the valve, and an upper spectral region, which comprises primarily fault-related noise in certain operating states. A frequency range separating these two spectral regions can be selected between 50 kHz and, for instance, 200 kHz, since the operating noise occurs primarily in the range of less than 120 kHz. In any case, a spectral region of the measurement signal above about 50 kHz, is evaluated for fault detection.

The present embodiment is based on the discovery that fault-related noise with respect to gases is primarily produced by ultrasonic flow and, with respect to liquids, primarily by cavitation. Ultrasonic flow is produced as a result of even the smallest valve leaks. Along edges and narrow points leaks cause compression waves and refraction waves in gaseous media. Extremely rapid, spontaneous compression waves, alternating between local ultrasonic flow and subsonic flow in the gas, result in high-energy, broadband ultrasonic emissions, the spectral frequencies of which are comparable to those of cavitation in liquids. Cavitation is defined as the formation and subsequent condensation of vapor bubbles in flowing liquids caused by changes in velocity. Cavitation occurs when the pressure locally falls below the vapor pressure of the liquid as the flow accelerates, so that vapor bubbles form. Subsequent deceleration causes the static pressure to increase above the vapor pressure so that the vapor bubbles condense again. Due to the sudden reduction in volume, this results in an abrupt collision of the liquid particles that previously surrounded the vapor bubble and strong pressure surges. These pressure impulses produce an acoustic signal with a spectral distribution that is similar to that of white noise, i.e., it is possible to detect signal components up into the high frequency ranges.

An increase in cavitation can have a number of causes: e.g., abrasive wear, deposits, or valve seat damage. Particularly in a closed valve, the occurrence of cavitation noise is a clear indication of leakage flow of a valve that no longer seals properly. The intensity of the cavitation noise is a function of the pressure on the valve and the process medium flowing through the valve.

Flow through leaks in a valve produces operating noise as well as fault-related noises. The fault-related noises are ultrasonic noises, which are largely independent of the state of aggregation of the medium, liquid or gaseous, and of the type of the medium, and which resemble one another with respect to their frequency distribution. In regard to the spectral intensity distribution, this applies especially to frequencies above 100 kHz. On the other hand, the difference in the amplitudes of the sound spectra of different low-viscosity liquids and gases, especially in the frequency range below 100 kHz, ranges from slight to distinct depending on the media characteristics, e.g., the vapor pressure of the components, and depending on the energy of the cavitation or flow change that acts locally within the medium.

Problematic for ultrasound diagnostics are substances of medium viscosity in which the sound level of the ultrasonic noise is very low due to unfavorable vapor pressures. Consequently, the highest amplitudes for medium viscosity substances must be analyzed near or in the frequency range of the operating noise. In addition, in actual process plants, frequency spectra of a wide variety of operating noise are superimposed on the low-frequency spectral components of the fault-related noise. In high-viscosity liquids, due to their low vapor pressure, valve faults are very difficult to analyze by evaluating the ultrasonic fault-related noise. They can be readily analyzed at high pressures, however, or with heating to just before the point where the state of aggregation changes.

Typically, only the operating noise can be detected. To detect small leaks, an additional pressure sensor mechanism on the inflow and outflow sides of the valve is suitable. Although the development of ultrasonic fault-related noise in valves for liquid and gaseous media has different physical bases, these noises, due to their similarities with respect to frequency distribution in the upper spectral region can be evaluated for diagnostic purposes using the same selection and detection means and the same fault criteria. Furthermore, the amplitude ratios of successive spectral bands in the spectral region greater than 200 kHz are much more similar in both cases than in the lower spectral region and are thus suitable for the same type of evaluation. Interference by internal or external operating noise is significantly lower due to their spectral distribution in the high frequency range. In addition, the relatively small amplitudes of the high-frequency spectral components in ultrasonic fault-related noise are dampened more strongly by adjacent noise sources through the transmission media and the mechanical connections than for low-frequency components.

A further advantage of evaluating only the higher spectral components of the acoustic signal is that the piping in which the valve is installed in a process plant acts like a low-pass filter with respect to sound. Consequently, the high frequency components of any cavitation noise in adjacent components, e.g., adjacent valves, do not reach the acoustic sensor of the monitored valve and at most cause a slight distortion of the measurement signal in the high spectral region. This improves the signal-to-noise ratio in the evaluated spectral region above 50 kHz compared to the lower spectral region in which the predominant portion of the operating noise can be found. Filtering with a limit frequency of, for instance, 500 kHz has the effect that practically only the acoustic signal produced by the monitored valve is evaluated.

Particularly advantageous is an active high-pass filter placed directly at the acoustic sensor, preferably in the same housing as the acoustic sensor, to reduce the noise component caused by low-frequency operating noise already in the measurement signal. Without such filtering, the operating noise in a spectral region below the limit frequency of 50 kHz would be stronger, by a factor of about 1000, than the acoustic signals of a spectral region to be evaluated at about 600 kHz. Filtering frees the recorded acoustic signal from the excessively strong low-frequency components of the structure-borne noise signal. The operating noise component, which in this connection may also be referred to as interfering signals, is reduced in the measurement signal, so that a better signal-to-noise ratio is achieved. As a result, commercially available amplifiers or filters can advantageously and cost-effectively be used for further signal conditioning in the evaluation unit.

An acoustic transducer with a transducer element made of a piezo-electric material, which is configured in such a way that it is comparatively insensitive in the area of the low-frequency operating noise but is sensitive in the higher-frequency range, has the advantage that a high-pass filter effect is inherently achieved by the transducer element. As a result, any active high-pass filter of the acoustic sensor is supported or it can be eliminated if the high-pass effect of the acoustic transducer is adequate. Filtering out the lower spectral region through the structure of the transducer element, which is made of a piezo-electric material, is already achieved by suitably defining its resonance frequency, which is determined not only by the material properties, but also by the geometric dimensions, e.g., the diameter and thickness of the transducer element.

Since, for an evaluation of the signal components in defined spectral regions, filtering of the signal components in the other spectral regions with damping of at least 80 dB to 120 dB is desirable, it is particularly advantageous to arrange the acoustic sensor inside a housing to shield it. This provides very good protection against interference of electromagnetic or electrostatic fields to prevent the very small useful signals in the spectral region of interest from being distorted and to ensure that they appear sufficiently clearly against the large low-frequency signal components of the operating noise.

Transistors that can be used for impedance conversion at the signal pick-off of the piezo-electric transducer element are available in high-temperature-resistant and simultaneously low-noise versions. To make it possible to use low-noise operation amplifiers for the active high-pass filter, means are advantageously provided between the impedance converter and the active high-pass filter for thermal decoupling of the active high-pass filter from the mounting location. These means can be realized as thermal insulation by a connection that is a poor heat conductor between the housing segments receiving the transducer element with the impedance converter or the active high-pass filter and by a cooling device, e.g., a finned cooling element for the active high-pass filter. This advantageously expands the field of application of the diagnostic system with respect to the maximum permissible temperature of the process medium.

The outside of the bottom of the acoustic transducer housing is advantageously provided with a threaded stem as a mounting means. The threaded stem and the direct contact surface of the housing bottom to the mounting location achieve good coupling of the acoustic vibrations into the piezo-electric measuring element. The acoustic transducer can be simply mounted to the valve housing or to the valve lifter. A polished, level contact surface to ensure good sound transmission and a complex press-on device, e.g., with a strap retainer or magnet, are not required. The acoustic transducer permits good acoustic coupling even on curved or rough surfaces.

An optional high-pass filter with adjustable limit frequency in the evaluation unit has the advantage that the influence of adjacent sound sources can be adequately suppressed as a function of the proximity and the filtering effect of the piping by adding this high-pass filter and changing the limit frequency. Setting the limit frequency as a function of the valve and the media is furthermore advantageous to permit adequate distinction between background noise and cavitation noise. It is useful, for instance, to set the limit frequency lower for a gaseous medium than for a liquid medium to achieve approximately the same sensitivity for distinguishing between background noise and cavitation noise.

In addition, an optional bandpass filter with adjustable upper and lower limit frequency can be provided in the evaluation unit. Such a bandpass filter advantageously allows scanning across different spectral regions of the measurement signal. This enables a comparison of the signal intensity in one spectral region with that in another spectral region.

Using the optional bandpass filter permits the use of the following method to reduce the influence on the measurement result of the background noise in the measurement signal. The strength of the background noise in the measurement signal is determined by measuring the strength of the signal in a spectral region above a second limit frequency, e.g., 1 MHz, which is greater than a first limit frequency, e.g., 500 kHz, and is selected such that cavitation noise affects the measured value only to a small extent. The strength of the cavitation noise, on which the background noise is superimposed as an interference signal, is subsequently determined by measuring the signal strength in a spectral region between the first and the second limit frequency. The initially determined strength of the background noise is then used to define a threshold value. If the strength of the cavitation noise exceeds this threshold value, the evaluation unit generates a fault indication signal. Thus, the measurement result is largely independent of the background noise, which itself is highly variable depending on the medium and the environment of the valve within the process plant and, also, depending on the properties of the valve itself.

To achieve a diagnosis that has the advantage of being more closely adapted to the specific conditions, the threshold value is established by determining and storing the ratio of the strength of the cavitation noise to the strength of the background noise when the valve is new. The threshold value is then selected to be higher than the strength of the background noise that was measured for diagnosis multiplied by this ratio.

Based on successive diagnostic measurements, it is advantageously possible to project a trend as to when the threshold value will probably be exceeded. This trend determination permits early detection and evaluation of slowly developing faults, which makes it possible to avoid equipment and product defects that might otherwise lead to unexpected plant downtime with high follow-up costs. As a result, the individual maintenance requirements of the separate plant components can be coordinated and the plant down-time required for valve maintenance can be minimized.

Operating noise and fault-related noise are measured at certain operating states for diagnosis and compared to similar values measured at an earlier time to determine a trend. Determining the operating noise further helps to determine the fault type. In connection with defined operating frequencies, increasingly high signal levels of certain higher fault frequency bands and their slow shift toward lower frequencies allow the conclusion of abrasive wear of the valves. Other frequency correlations in the middle fault frequency range and increasing operating noise indicate deposits. Damage to the valve seat on the other hand is indicated by rather abrupt frequency changes in the fault signal at different positions of the slightly open valve without a significant change in the operating noise. As a result of the diagnosis, the evaluation unit can generate and issue an "OK" status message, an early fault warning, or a fault warning. If a fault type can be derived from the measurement signal, the fault indication signal includes an identification of the fault type. If the fault type is known, suitable valve maintenance measures can be introduced.

A device and method in accordance with the present embodiment permits valve diagnostics that are advantageous for the operator and can be activated continuously or optionally in only defined operating states or at defined intervals. The diagnostics can be conducted without shutting down the plant and can be integrated into the process equipment and into the process sequence. Due to the properties of the acoustic sensor and the evaluation unit, the diagnostic system is so simple to handle that any control valves or other machine parts, e.g., flow meters or slide valves, can be retrofitted without interrupting operations of the plant.

BRIEF DESCRIPTION OF THE DRAWINGS

The invention as well as embodiments and advantages thereof will now be described in greater detail with reference to the drawings, which depict an exemplary embodiment of the invention and in which.

DETAILED DESCRIPTION OF THE PREFERRED EMBODIMENTS

Figure 1:
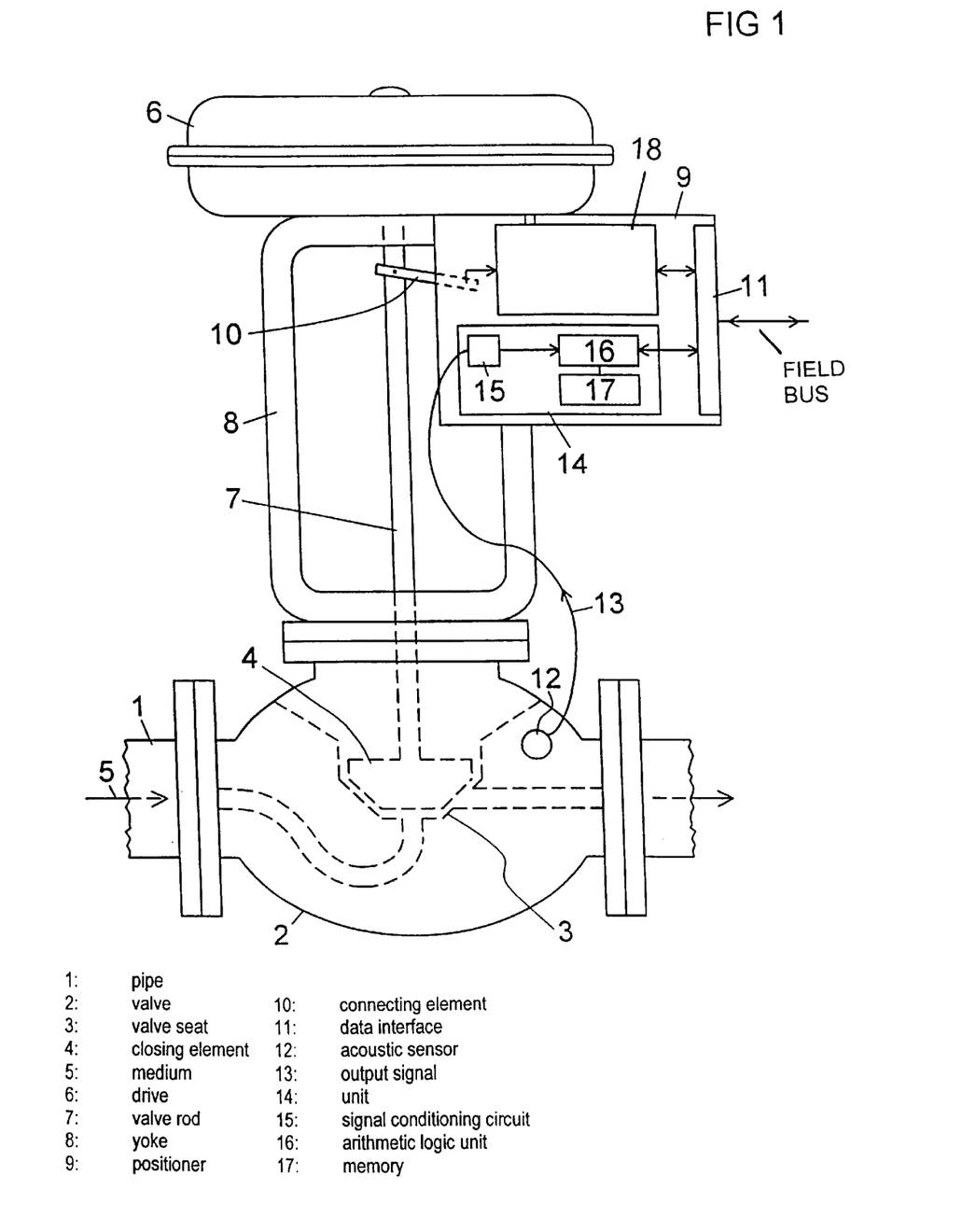
FIG. 1 shows the basic structure of a control valve with a diagnostic system.

According to one embodiment of the invention, referring to FIG. 1, a valve 2 is installed in a pipe 1 of a process plant (not depicted). Valves, by a corresponding lift action of a closing element 4, which cooperates with a valve seat 3, controls the flow of a medium 5 through pipe 1. The lift action is produced by a pneumatic drive 6 and transmitted to the closing element 4 by a valve rod 7. Drive 6 is connected with the housing of valve 2 via a yoke 8. A positioner 9, which detects the lift on the input side via a connecting element 10 engaging with valve rod 7, is mounted to yoke 8. Positioner 9 compares the amount of lift with a setpoint value supplied by a field bus via a data interface 11 and on the output side controls pneumatic drive 6 in terms of a compensation of the control deviation. An acoustic sensor 12, with a corresponding output signal 13 supplied as a measurement signal to a unit 14 for detecting, storing and evaluating structure-borne noise spectra, is mounted to the housing of valve 2. In the embodiment shown, unit 14 forms part of positioner 9, but alternatively unit 14 can be configured separately. Unit 14 comprises a signal conditioning circuit 15 in which the measurement signal 13 of the acoustic sensor 12 is amplified, filtered and digitized. In a downstream arithmetic logic unit 16, the frequency spectrum is determined from the conditioned version of signal 13, e.g., by a fast Fourier transform. Depending on system requirements, this frequency spectrum can be stored in a memory 17 or further evaluated to obtain information on the state of valve 2. Detection, storage and evaluation of the structure-borne noise spectrum is performed periodically or prompted via interface 11. Interface 11 is also used to deliver a request for the result of the evaluation of the structure-borne noise spectra via the field bus. In addition to the unit 14, the positioner 9 houses a control unit 18, which receives signals indicative of the lift of the connecting element 10 and setpoint values from the field bus, as well as provides the required control signals and output signals to the pneumatic drive 6 and the field bus, respectively.

As an alternative to the above-described embodiment, some evaluation functions can be relocated from unit 14 to a personal computer (PC) (not depicted) connected to the field bus. A digitized measurement signal or data describing the characteristics of the measurement signal can then be transmitted to the PC via data interface 11. Separating the signal evaluation function from the valve offers a particularly favorable price/performance ratio due to the common utilization of the parameter control for the signal conditioning circuit 15 and the evaluation of the conditioned measurement signal. The resources offered by a personal computer make it easily possible to use optimizing neural analysis software to prepare valve fault statistics and determine fault trends. In addition, personal computers make possible a "learning" parameterization of the signal conditioning circuit 15 for adaptation to various conditions at the installation site of the valve and various valve types and, thus, permit a self-optimization of the diagnostic system. Such a diagnostic system can be implemented for a relatively large number of components to be monitored with comparatively low complexity because the decentrally arranged circuit elements of the system are reduced and simplified to the necessary measure.

As an alternative to mounting the acoustic sensor 12 on the exterior wall of the housing, the acoustic sensor 12 can, for instance, be fixed to yoke 8, to a connecting flange between yoke 8 and the housing, to the flanges between the housing and pipe 1, or to valve rod 7. Mounting the acoustic sensor to valve rod 7 has the advantage that especially the high-frequency signal components of the structure-borne noise of adjacent components in the process plant, which reach the valve to be monitored after having been dampened by pipe 1, are subject to further damping by the typically used stuffing box on the housing passage of valve rod 7. On the other hand, the structure-borne noise of the monitored valve is advantageously transmitted directly to valve rod 7 via closing element 4.

Figure 2:
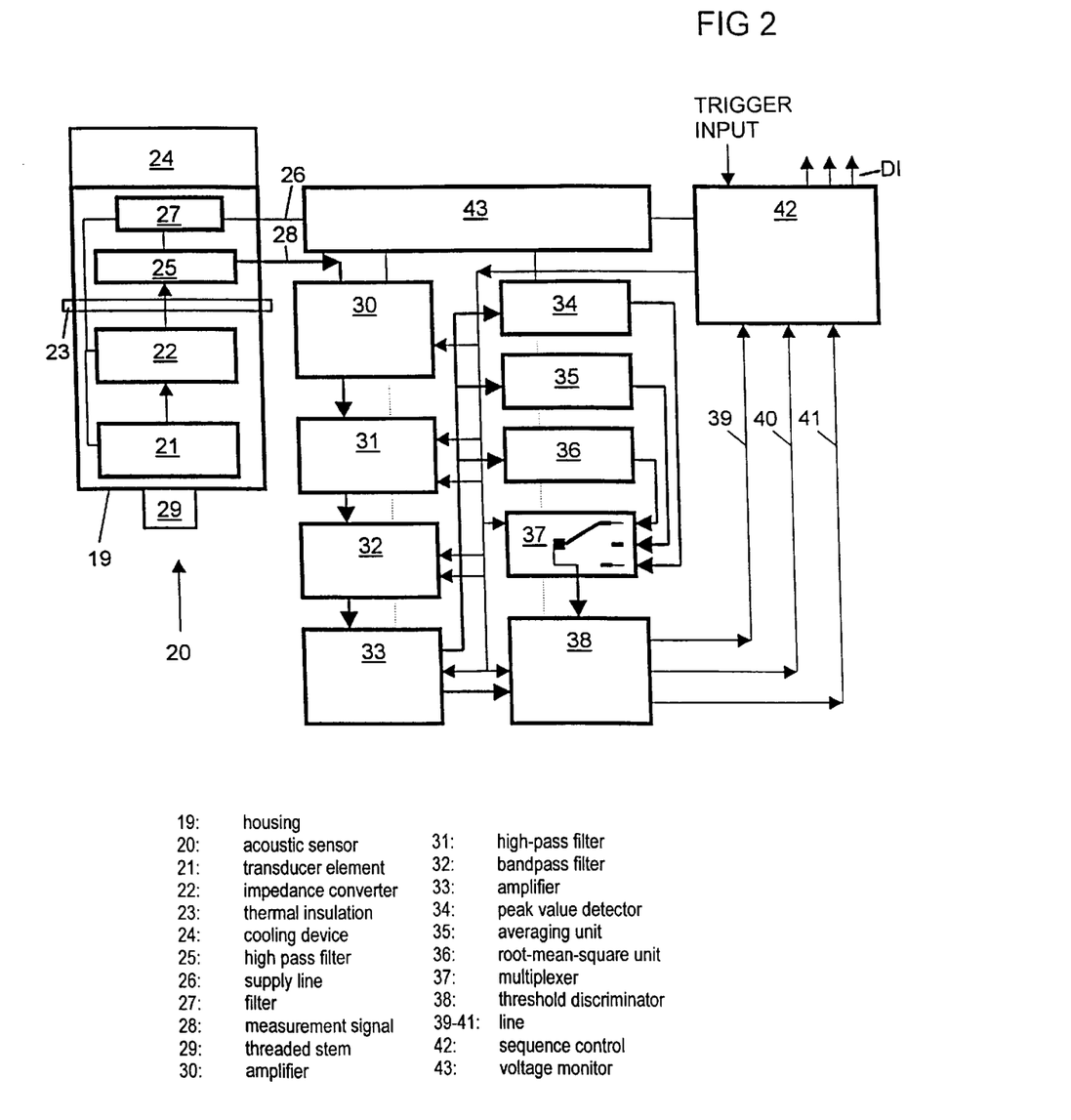
FIG. 2 is a block diagram of a diagnostic system.

According to FIG. 2, and a corresponding further embodiment of the invention, the structure-borne noise is recorded by an acoustic sensor 20 whose electronic components are protected against electromagnetic and electrostatic radiation by a housing 19. A transducer element 21, which is made of a piezo-electric ceramic material, is arranged near a bottom plate of the housing by which the acoustic sensor is pressed against the mounting location by screwing a threaded stem 29 into a corresponding threaded hole. Between transducer element 21 and the bottom plate, an insulating ceramic element (not depicted), the structure of which is produced by micromechanical production methods and which acts as a high-pass filter, can be provided to filter the structure-borne noise. Connected on the output side of the transducer element 21 is an impedance converter 22, which comprises only high-temperature-resistant, low-noise transistors in addition to the passive components. The components, transducer element 21 and impedance converter 22, are exposed to the temperatures at the mounting location. Other parts of the acoustic sensor 20 are thermally decoupled from the mounting location by thermal insulation 23 and a cooling device 24, so that low-noise, but less high-temperature resistant operation, amplifiers can be used for the construction of an active high-pass filter 25. To prevent electromagnetic interference, a filter 27 is provided at the input for a supply line 26. A measurement signal that is output by the active high-pass filter 25 has already been filtered in the acoustic sensor 20. As a result, the signal components of the structure-borne operating noise, the intensity of which is approximately 1000 times greater than the cavitation noise, are substantially reduced and an evaluation of the cavitation noise, with a measurement signal 28, is significantly facilitated.

Additional apparatuses for signal conditioning are provided in the evaluation unit. A unit for signal conditioning comprises an amplifier 30 with a bandwidth of, for instance, 5 MHz and an adjustable or controllable output voltage, an optional high-pass filter 31 with adjustable limit frequency, a likewise optional bandpass filter 32 with adjustable upper and lower limit frequency, and an amplifier 33, which is combined with a low-pass filter with switchable limit frequency. To evaluate the intensity of the conditioned measurement signal, the output signal of amplifier 33 is routed to a peak value detector 34, an averaging unit 35, and a root-mean-square unit 36. A multiplexer 37 selects one of the output signals of components 34, 35 or 36 to evaluate the intensity of the conditioned measurement signal. A fault indication signal is generated in a threshold discriminator 38 if the intensity of the conditioned measurement signal exceeds a defined threshold value. For example, a "valve fault" message is output on a line 39, a "fault trend" message on a line 40, and a "valve OK" message on a line 41 to a sequence control 42 with status memory (not depicted). The sequence control 42 relays these fault messages via a data interface ("DI") and from this data interface, via a trigger input, receives a prompt to execute a diagnosis. All the electronic components of the diagnostic system have a common voltage supply and voltage monitor 43.

Figure 3:
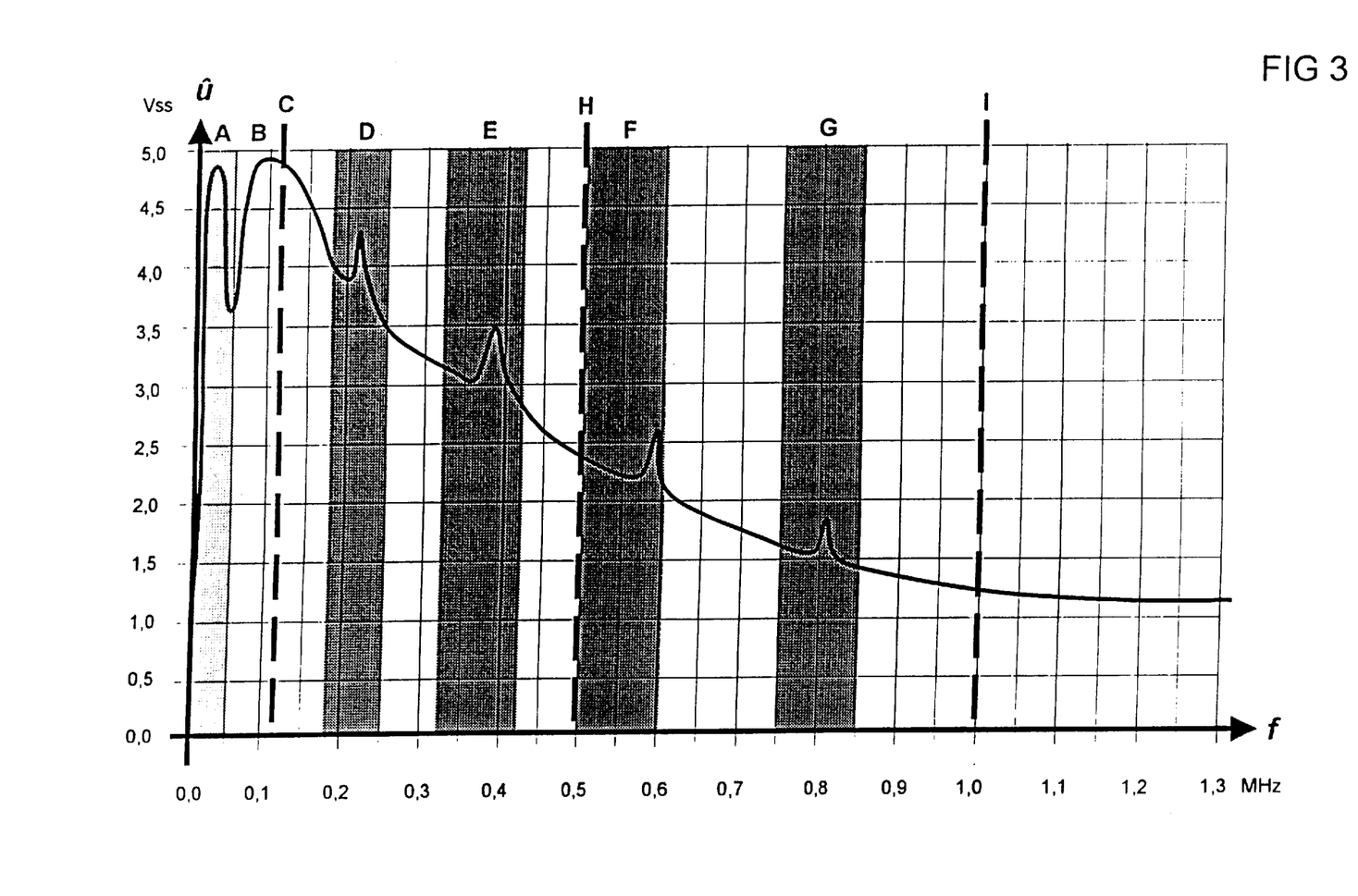
FIG. 3 is a frequency diagram of a typical measurement signal with cavitation noise.

Based on the curve of a typical frequency spectrum as shown in FIG. 3, it is clear that comparatively strong operating noise is present in the measurement signal despite the strong high-pass filtering in the acoustic sensor. The frequencies with maximum peak voltage, VSS, of the operating noise are identified as A and B at the upper edge of the diagram. Correspondingly adjusting the limit frequencies of the bandpass filter (32 in FIG. 2) makes it possible to detect the signal components in the frequency ranges D, E, F and G, which are primarily caused by cavitation noise. The vertical lines at frequencies C, H and I mark possible limit frequencies that can be adjusted to evaluate the signal components in the corresponding frequency spectra, e.g., in the high-pass filter (31 in FIG. 2) or in the bandpass filter (32 in FIG. 2).

The separation of the noise spectrum occurs automatically via valve- and process-adaptive filtering that scans across the different spectral regions, with basic parameter data that can be loaded via the field bus. If the valve type and the basic process conditions are known, scanning of the spectral regions can take place with predefined limit frequencies or, otherwise, needs to detect only a frequency band that is characteristic for fault detection.

After signal conditioning, the signal components selected by spectral regions are further processed. The spectral regions are examined for their peak values, sliding averages, or sliding effective energy contents. The results are stored for statistical purposes and further evaluation, for instance, to calculate the sliding comparison value from recent measurements or to calculate comparison values from a more distant past. To evaluate the condition of the valve, the intensity of the selected signal components is compared with the comparison values as error limits, the results are stored, and corresponding fault indication signals are generated.

If possible in regard to complexity, the measurement signal should be digitized directly at the input of the evaluation unit so that further evaluations, e.g., by signal processors, can be performed digitally. In principle, the selection of the signal components by spectral regions, the determination of the signal level and the energy, as well as simple analysis for threshold definition, fault evaluation, and trend determination can be analog or digital. Any expanded analysis beyond that, however, might require greater computational capacity in a digital signal processor or in an external, organizationally higher-level device, e.g., a personal computer.

By using fuzzy technology and self-learning adaptive diagnostic strategies based on neural structures, a fully automatic diagnostic sequence can be achieved. Particularly for largely automatic fault detection on a relatively large number of components to be monitored, neural evaluation in a central arithmetic-logic unit, e.g., a personal computer coupled via a field bus, is cost-effective. The parts required for diagnosis of the valves to be examined can be adjusted by remote control via the field bus and the measurement signals can be centrally evaluated. The costs for the parts to be arranged decentrally on the valve are limited in this case to the acoustic sensor and the circuit parts that are remote controlled via the field bus, i.e., a filter amplifier as well as a signal processor with analog/digital converter, and a communications interface. The filter amplifier can furthermore be integrated in the acoustic sensor or, together with the remote-controlled signal processor and the analog-to-digital converter, can form an optional add-on unit of a positioner for a control valve.

Figure 4:
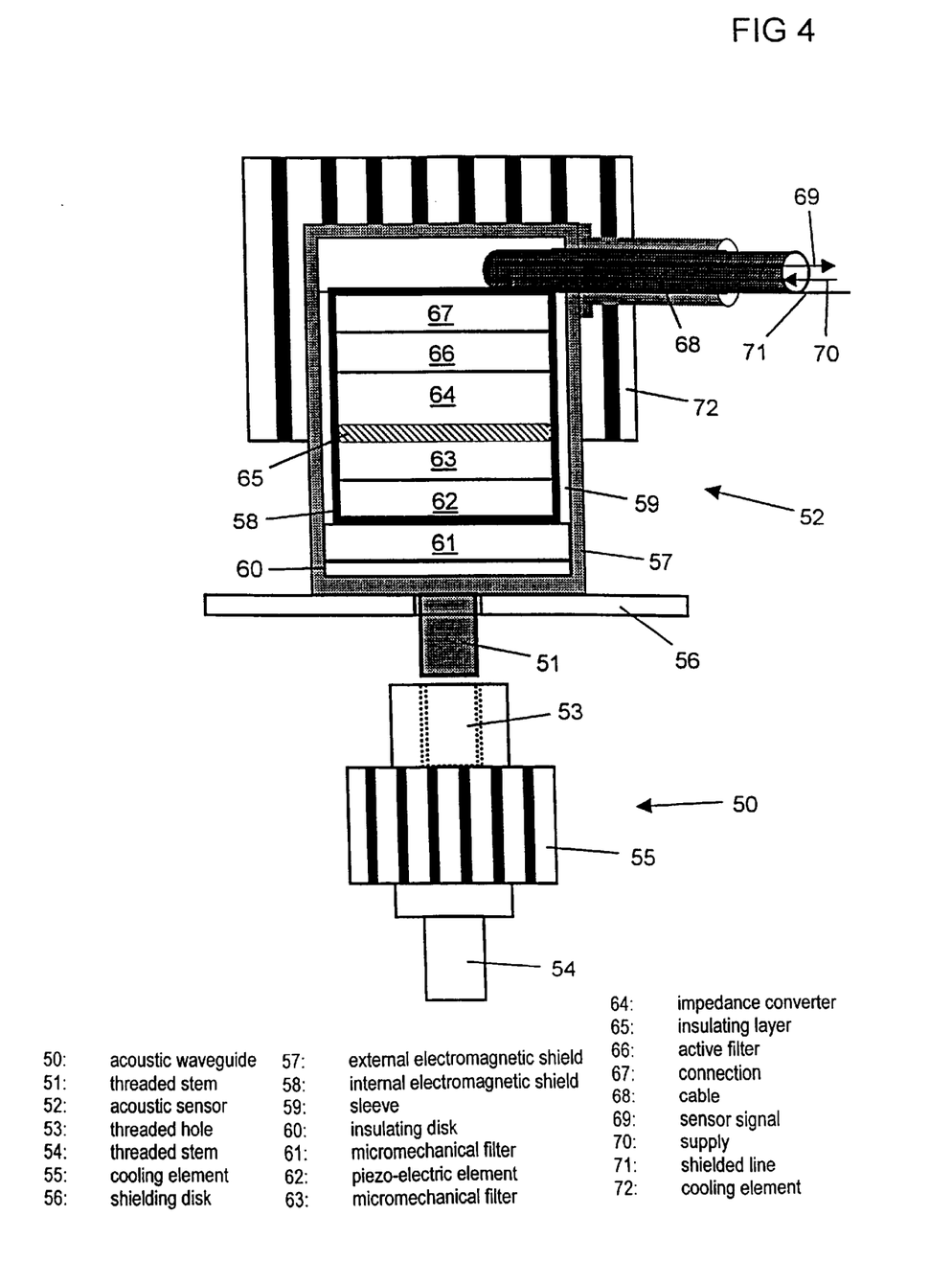
FIG. 4 is a principal diagram of an acoustic transducer.

For a fault-related noise analysis on extremely hot plant parts, a rod-shaped acoustic waveguide 50 may be used as shown in FIG. 4. The waveguide 50 is preferably made of high-grade steel and is provided with a threaded hole 53 for screwing in a threaded stem 51 of an acoustic sensor 52. On its opposite end, waveguide 50 is provided with a threaded stem 54 so that it can be screwed into a corresponding threaded hole at the mounting location. A finned cooling element 55 is pressed onto the acoustic waveguide 50. A shielding disk 56 can be inserted between the acoustic waveguide 50 and the acoustic sensor 52 to shield the acoustic sensor 52 against the heat that radiates from the mounting location. The acoustic waveguide 55 can be used to increase the distance, as necessary, between the acoustic sensor 52 and the mounting location on a hot plant component. It can be used similarly to an extension piece, in which the threaded stem 51 is screwed into the one end and the other end has a threaded stem 54 for screwing into the threaded hole at the mounting location. The threaded stem 54 serves for both fastening to the mounting location and coupling the noise into the acoustic waveguide 55 and thus into the acoustic sensor 52. The acoustic waveguide 50 provides good thermal decoupling between a hot mounting location and the acoustic sensor 52.

The acoustic sensor 52 has an external electromagnetic shield 57 and an internal electromagnetic shield 58, which are electrically insulated from one another by a sleeve 59. On the bottom area of the external electromagnetic shield 57 there is an insulating disk 60 made of a ceramic material. Above insulating disk 60 is a micromechanical filter 61. Arranged on the inside of the bottom area of the electromagnetic shield 58 is a piezo-electric element 62, which is also made of a ceramic material. Above element 62 is a further micromechanical filter 63. Between the micromechanical filter 63 and an impedance converter 64, an insulating layer 65 provides thermal decoupling. On the output side of impedance converter 64 is an active filter 66 to which a cable 68 is connected by connection 67. Cable 68 is used to pick off a sensor signal 69 and to feed a supply 70 with a shielded line 71. A cooling element 72 with longitudinal fins is pushed onto the outer shield 57. Depending on the installation position of the acoustic sensor, it may be useful, as an alternative, to use a cooling element with transverse fins.

The above description of certain embodiment of the inventions has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A diagnostic system comprising:

a sensor operable to sense structure-borne noise;

an evaluation unit operable to evaluate a recorded measurement signal, wherein the measurement signal is representative of at least a portion of the structure-borne noise and said evaluation unit is configured such that a spectral region of the measurement signal above a first limit frequency, where the first limit frequency is greater than 50 kHz, is evaluated for fault detection, and a fault indication signal is generated if an intensity of the measurement signal in the spectral region exceeds a threshold; and a determining means for determining a strength of background noise in the measurement signal by measuring a signal strength in a spectral region above a third limit frequency, the third limit frequency being greater than a second limit frequency and selected such that influence on the measurement signal by cavitation noise is minimized, determining a strength of the cavitation noise in the measurement signal by measuring the signal strength in a spectral region between the second limit frequency and the third limit frequency, and determining the threshold value based on the strength of the background noise; and generating the fault indication signal if the strength of the cavitation noise exceeds the threshold value.

2. A diagnostic system as claimed in claim 1, further comprising: a positioner operable to actuate a valve; and a drive unit operable to drive said positioner, wherein the structure-borne noise sensed by said sensor is located at the valve.

3. A diagnostic system as claimed in claim 1, wherein said evaluation unit comprises: an active high-pass filter operable to reduce a component in the measurement signal, wherein the component is caused by low-frequency operating noise.

4. A diagnostic system as claimed in claim 1, wherein the sensor comprises a transducer element that is relatively insensitive to lower-frequency operating noise and relatively sensitive to higher-frequency noise.

5. A diagnostic system as claimed in claim 4, wherein said transducer element comprises a piezo-electric material.

6. A diagnostic system as claimed in claim 1, wherein said sensor comprises a housing operable to shield components of said sensor from electromagnetic and electrostatic fields.

7. A diagnostic system as claimed in claim 1, wherein said sensor comprises:

an active high-pass filter; a mounting location: and means for thermally decoupling said active high-pass filter from said mounting location.

8. A diagnostic system as claimed in claim 1, wherein said sensor comprises a threaded mounting stem.

9. A diagnostic system as claimed in claim 1, wherein said evaluation unit comprises a high-pass filter with an adjustable limit frequency.

10. A diagnostic system as claimed in claim 1, wherein said evaluation unit comprises a bandpass filter with adjustable upper and lower limit frequencies.

11. A diagnostic method comprising:

sensing structure-borne noise;

evaluating a recorded measurement signal for fault detection, wherein a spectral region of the measurement signal above a first limit frequency greater than 50 kHz is evaluated;

generating a fault indication signal if the intensity of the measurement signal in the spectral region exceeds a threshold value;

determining a strength of background noise in the measurement signal by measuring a signal strength in a spectral region above a third limit frequency, the third limit frequency being greater than a second limit frequency and selected such that any influence on the measured signal strength by cavitation noise is minimized;

determining a strength of the cavitation noise in the measurement signal by measuring the signal strength in a spectral region between the second limit frequency and the third limit frequency;

determining the threshold value based on the strength of the background noise; and generating the fault indication signal if the strength of the cavitation noise exceeds the threshold value.

12. A diagnostic method as claimed in claim 11, further comprising: actuating a valve using a positioner via a drive, and wherein the sensed structure-borne noise is located at the valve.

13. A diagnostic method as claimed in claim 11, further comprising: determining a ratio relative to the strength of the cavitation noise and the strength of the background noise, wherein the strength of the cavitation noise and the strength of the background noise correspond to a fault-free state of a valve; and modifying the threshold value to be higher than the strength of the background noise multiplied by the determined ratio.

14. A diagnostic method as claimed in claim 13, wherein the valve in said step of determining the ratio is a new valve.

15. A diagnostic method as claimed in claim 13, further comprising: determining a trend indicative of when the threshold is likely to be exceeded, wherein the trend is based on successive diagnostic measurements.

16. A method for determining a fault in a valve through which a gaseous or a liquid material flows, the method comprising:

measuring an acoustic signal generated in a vicinity of the valve as the gaseous or liquid material flows through the valve;

separating the acoustic signal into a low frequency portion and a high frequency portion;

determining a strength of background noise in the acoustic signal by measuring a signal strength in a first spectral region of the high frequency portion selected such that influence on the measured signal strength by cavitation noise is minimized;

determining a strength of the cavitation noise in the acoustic signal by measuring the signal strength in a second spectral region of the high frequency portion lower than the first spectral region;

determining a threshold value based on the strength of the background noise; and generating a fault indication signal if the strength of the cavitation noise exceeds the threshold value.

17. A method as claimed in claim 16, wherein the high frequency portion consists essentially of signals having a frequency above approximately 50 kHz.

18. A method as claimed in claim 17, wherein the high frequency portion consists essentially of signals having a frequency above approximately 200 kHz.

19. A method as claimed in claim 17, wherein the high frequency portion consists essentially of signals having a frequency above approximately 500 kHz.

20. A method as claimed in claim 16, further comprising using fuzzy logic or a neural network.

21. A method as claimed in claim 16, further comprising: determining an estimated time after which the valve is more likely than not to exhibit a fault, wherein said determining of the likelihood value is based on a frequency spectrum of the acoustic signal.

22. A method as claimed in claim 16, further comprising: determining a type of fault, wherein said type of fault is based on a frequency spectrum of the acoustic signal.

* * * * *